United States Patent [19]

Bornstein, deceased et al.

[11] Patent Number: 4,661,412

[45] Date of Patent: Apr. 28, 1987

[54] MELAMINE-MODIFIED PHENOLIC TYPE RESIN FOR CONTINUOUS LAMINATION

[75] Inventors: Leopold F. Bornstein, deceased, late of Atlanta, by Marcia G. Bornstein, Executrix; Gary P. Fillingame, Conyers, both of Ga.

[73] Assignee: Georgia-Pacific Resins, Inc., Atlanta, Ga.

[21] Appl. No.: 871,465

[22] Filed: Jun. 5, 1986

Related U.S. Application Data

[62] Division of Ser. No. 690,856, Jan. 11, 1985, Pat. No. 4,611,020.

[51] Int. Cl.$^4$ ............... C08G 14/10; C08G 14/12
[52] U.S. Cl. ................... 428/426; 427/365; 427/369; 427/370; 428/526; 428/531; 524/226; 524/233; 524/379; 524/595; 525/504; 528/147; 528/163
[58] Field of Search ............ 528/147, 163; 525/504; 524/233, 226, 379, 595; 428/426, 531, 526; 427/365, 369, 370

[56] References Cited

U.S. PATENT DOCUMENTS

| | | |
|---|---|---|
| 2,218,373 | 10/1940 | Alexander . |
| 2,315,400 | 3/1943 | D'Alelio . |
| 2,565,538 | 8/1951 | Welch et al. . |
| 2,801,198 | 7/1957 | Morris et al. . |
| 2,826,559 | 3/1958 | Updegraff et al. . |
| 2,834,745 | 5/1958 | Weber et al. . |
| 2,981,652 | 4/1961 | Peterson et al. . |
| 3,036,028 | 5/1962 | Malashevitz . |
| 3,070,572 | 12/1962 | Oland et al. . |
| 3,131,086 | 4/1964 | Nyquist et al. . |
| 3,321,551 | 5/1967 | Knutsson . |
| 3,364,167 | 1/1968 | Imai et al. . |
| 3,616,046 | 10/1971 | Benzinger . |
| 3,707,296 | 12/1972 | Palazzolo et al. . |
| 3,707,692 | 12/1972 | Reeder et al. . |
| 3,897,589 | 7/1975 | Meier . |
| 3,929,695 | 12/1975 | Murata et al. . |
| 4,038,229 | 7/1977 | Eisele et al. ............... 524/233 |
| 4,115,366 | 9/1978 | Kellner . |
| 4,229,557 | 10/1980 | Feinauer et al. . |
| 4,611,020 | 9/1986 | Bornstein et al. ............ 528/163 X |

FOREIGN PATENT DOCUMENTS

| | | |
|---|---|---|
| 503537 | 6/1954 | Canada . |
| 1234513 | 2/1967 | Fed. Rep. of Germany . |
| 1469823.8 | 8/1969 | Fed. Rep. of Germany . |
| 2009474 | 2/1970 | France . |
| 2034771 | 12/1970 | France . |
| 55-123644 | 9/1980 | Japan . |
| WO85/03293 | 8/1984 | PCT Int'l Appl. . |

OTHER PUBLICATIONS

Chemical Abstracts, vol. 81, No. 10, 50588r, 1974.

Primary Examiner—Howard E. Schain
Attorney, Agent, or Firm—Banner, Birch, McKie & Beckett

[57] ABSTRACT

A fast-curing, melamine-modified phenolic laminating resin is described comprising the co-condensation product of aldehyde, phenol and melamine in a water-soluble organic solvent. The modified laminating resin exhibits sufficiently high penetration and curing characteristics for use in a low pressure, continuous laminating process.

14 Claims, No Drawings

MELAMINE-MODIFIED PHENOLIC TYPE RESIN FOR CONTINUOUS LAMINATION

This application is a division of application Ser. No. 690,856, filed Jan. 11, 1985, now U.S. Pat. No. 4,611,020.

BACKGROUND OF THE INVENTION

1. Field of the Invention

This invention relates to a thermosetting melamine-modified phenolic laminating resin having excellent penetration and rapid cure suitable for continuously making high-grade laminates at high speed and relatively low pressure.

2. Description of the Prior Art

Conventional decorative laminates typically are produced in a batchwise procedure by curing a plurality of thermosetting resin-impregnated fibrous substrate layers in a press at high pressures (e.g., 800–1500 psi) and elevated temperatures (e.g., 250°–350° F.). The laminates generally consist of three elements: a core section consisting of several sheets of an inexpensive substrate, e.g., kraft paper, saturated or impregnated with a resole-type phenolic resin, a print sheet of alpha cellulose saturated with an expensive amino resin, e.g., a melamine resin and a translucent overlay of rayon or alpha cellulose, also saturated with an expensive amino resin.

When preparing the laminate using this conventional process, the paper substrate first is passed through a dip tank generally filled with a solution of the laminating resin. Resin penetration of the substrate is substantially accomplished during immersion in the tank. Excess resin solution generally is removed from the substrate by opposed scraper bars or blades as the substrate leaves the dip tank. Residual penetration must be completed as the substrate is thereafter passed to the drying zone.

The drying zone generally comprises a long oven where the solvent for the resin is evaporated (down to about 5–10% by weight) and the resin is substantially advanced to a substantially non-tacky, infusible stage (B-Stage). The paper impregnated with the advanced resin is removed from the drying oven and then is cut to size, stacked and consolidated in the hot, high pressure press. Generally, the laminate is cured in the high pressure press for about 15 to 60 minutes. The laminate then is cooled, at pressure, to room temperature to ensure a flat, dimensionally stable panel and prevent blistering.

Because the laminate is consolidated in a batchwise fashion, the conventional high pressure laminating procedure is rather slow. This necessitates substantial capital investment in order to maintain high production rates, and consequently results in high production costs for the finished laminate.

In an attempt to improve the economics of the conventional laminating process, a continuous laminating procedure has recently been developed. In this process, a plurality of the fibrous, resin-impregnated (B-stage) substrate layers are consolidated at an elevated temperature by passing them between the nips of serially arranged pressure rolls. The cured and consolidated sheets then may be cut to the desired size at any time prior to use.

Because of the continuous operation, high production rates are possible. In this process, penetration and B-staging of continuous sheets and subsequent curing (consolidation) of a plurality of such sheets all can typically be completed in a more or less continuous manner in less than about 5 minutes. Consolidation pressures in this arrangement are normally limited, however, to below about 750 psi, e.g., about 200 psi, and therefore impose stringent requirements on the nature of the laminating resin. Not only must the resin quickly penetrate the substrate and flow under a relatively low consolidation pressure, but the resin also must subsequently cure in an extremely short time to yield a product with properties at least comparable to conventional laminates. Additionally, in some applications, to be commercially acceptable, the laminating resin also must exhibit a stability which allows the resin to be stored for a period of time prior to use, without undesirable advancement of the molecular weight and corresponding viscosity increase and reduction in penetration rate.

It is, therefore, a principal object of the present invention to provide a laminating resin that satisfies the stringent requirements of the continuous laminating process.

It is also an object of this invention to provide a phenolic laminating resin that has been modified to improve its cure rate.

It is a further object of this invention to provide a modified phenolic laminating resin that exhibits excellent flow under relatively low pressures.

It is another object of the present invention to provide a rapid curing, melamine modified phenolic laminating resin that exhibits a penetration suitable for the continuous lamination process.

SUMMARY OF THE INVENTION

These and other objects, which will be apparent from the following description, are satisfied by a thermosetting laminating resin composition having a pH in the range of about 7.0 to about 9.0 comprising (a) a thermosetting melamine-modified phenolic resin prepared by co-reacting at a pH in the range of about 7.5 to about 9.5 and in the presence of an inorganic alkaline catalyst, a reaction mixture containing phenol, aldehyde and melamine, the mole ratio of aldehyde to phenol in said reaction mixture being maintained in the range of about 1.5 to about 3.0 and the mol ratio of phenol to melamine in said reaction mixture being maintained in the range of about 2.0 to about 10.0; and (b) a water-soluble, organic solvent for said melamine-modified phenolic resin.

The present invention also relates to a method for producing a laminate comprising the steps of saturating a plurality of continuous, fibrous substrate sheets with the fast-curing melamine-modified phenolic laminating resin described above; drying and partially curing the resin-saturated continuous sheets to produce resin-impregnated continuous sheets and, consolidating the resin-impregnated continuous sheets at a pressure of between about 140 to about 750 psi for a time and at a temperature sufficient to fully cure the resin.

In a further aspect, the present invention pertains to the resin-impregnated product prepared by saturating and curing a fibrous substrate sheet with the above-described laminating resin composition.

DETAILED DESCRIPTION OF THE INVENTION

The present invention specifically relates to a fast curing, melamine-modified, thermosetting phenolic laminating resin composition. The melamine-modified phenolic resin used in the present composition is produced by co-reacting aldehyde, phenol and melamine in the presence of an alkaline catalyst under moderately elevated reaction temperature conditions. The reaction typically is conducted under reflux at atmospheric pressure. The so-prepared melamine-modified phenolic resin then is dissolved in a water-soluble organic solvent.

In the broad practice of this invention aldehyde components such as formaldehyde, acetaldehyde, propionaldehyde, furfural or the like can be used to prepare the resin component of the composition. Formaldehyde generally is preferred as the sole aldehyde reactant because of its low cost and high reactivity. In particular, applicants have found that a very desirable resin from the standpoint of curing speed and resin stability can be produced when using formaldehyde as the aldehyde reactant. The formaldehyde generally is added as a 50% aqueous solution (formalin), although anhydrous paraformaldehyde could also be used.

Phenols suitable for preparing the resin component of the laminating resin composition include standard phenol(hydroxybenzene), substituted phenols, such as cresol, and phenol homologs, which generally are employed in the prior art for forming phenolic resole (base-catalyzed) resins. Standard phenol generally is preferred as the sole phenol reactant since applicants have found that a very desirable resin from the standpoint of curing speed and resin stability can be produced when using this phenol as the phenolic reactant. To prepare the resin about 1.5 to about 3.0 mols of aldehyde (e.g., formaldehyde) are used for each mol of phenol. Most preferably, the aldehyde to phenol molar ratio is about 1.75 to 2.25.

While other aminotriazines besides standard melamine (cyanurtriamide), including guanamines, may be employed when preparing the thermosetting resin component of the laminating resin composition of the present invention, standard melamine clearly is preferred. The melamine is added in an amount such that the mol ratio of phenol to melamine in the reaction mixture is within the range of about 2.0 to about 10.0. At a mole ratio of below about 2.0 (i.e., at higher melamine contents) the storage stability of the subsequently-produced resin (at any pH) is adversely impaired, while at a mol ratio above about 10.0 (i.e. at lower melamine contents) the resin cure rate of the subsequently-produced resin, at a pH at which the resin is stable, is not adequate. Preferably, the phenol to melamine mol ratio is selected within the range of about 3.0 to about 6.0.

As noted, the phenol (e.g., hydroxybenzene), aldehyde (e.g., formaldehyde) and melamine (e.g., cyanurtriamide) are co-reacted in the presence of an inorganic alkaline catalyst. While an alkali metal or alkaline earth metal hydroxide such as sodium hydroxide or calcium hydroxide, or an alkali metal or alkaline earth metal salt of a weak acid may be used as the inorganic alkaline material, in order to produce a resin with the most desirable curing and stability properties an alkali metal carbonate typically is employed as the catalyst. Preferred alkaline catalyst materials include potassium and lithium carbonate. Potassium carbonate is particularly preferred because it yields a resin having the highest reactivity, and adequate stability and it does not undesirably increase the molecular weight of the resin to a point which interferes with penetration of the subsequently prepared laminating composition.

The phenol-aldehyde-melamine reactions preferably are advanced under carefully controlled conditions. After blending the phenol, aldehyde and melamine components, sufficient inorganic alkaline catalyst, e.g., an alkali metal carbonate catalyst such as potassium carbonate is added to the reaction mixture to adjust the pH to within the range of about 7.5 to about 9.5. Preferably, the pH is adjusted to within the range of about 8.0 to about 9.0. The mixture then is subjected to mild heating to increase the temperature up to about 75°–100° C., preferably 90°–100° C., e.g., up to about atmospheric reflux. The reaction mixture is held within this temperature range for a period of time of from about 15 minutes to about 2 hours. The reaction time is inversely related to temperature, with shorter times required at higher temperatures. Normally, the reaction is allowed to proceed until the resin exhibits a Gardner-Holt viscosity in the range of about a "B" to about an "S". Preferably the reaction is allowed to proceed until the viscosity is in the range of about an "F" to an "I". The viscosity of the resin at this point depends in part upon its water content, which in turn is a function of the water content of the various reactants used, so that an actual viscosity may be somewhat below or above this range.

The mixture then is cooled and the reaction mixture is neutralized with an acidic material. Preferably, a weak acid, and most preferably a weak organic acid, e.g., lactic, citric, propionic, butyric, etc. is added to neutralize the reaction mixture. The mixture is neutralized to a pH of about 7.0 to about 8.0. The neutralized resin then is vacuum dehydrated with heating to reduce, though generally not eliminate, its water content. The resin normally is dehydrated to a maximum moisture content of about 15% by weight. By neutralizing the resin before the vacuum distillation step, excessive resin advancement is prevented. Thereafter, the resin is cooled to ambient conditions.

It is important to carefully adjust the pH of the initial reaction mixture to between about 7.5 and about 9.5 before heating (reacting) the mixture. If the reaction is allowed to take place at a pH of below about 7.5 then a resin product insoluble in the organic solvent normally is formed, while reacting these components at a pH of above about 9.5 causes indesirable resin advancement and a corresponding reduction in penetration. As noted, the reaction preferably is initiated at a pH in the range of about 8.0 to about 9.0.

The complete laminating resin composition of the present invention then is prepared by adding additional materials (many optional) to the so-prepared resin.

In order to reduce resin viscosity to a level suitable for the continuous high speed, relatively low pressure laminating process, a water-soluble organic solvent for the resin is added. Generally, a sufficient amount of solvent is added to adjust the viscosity of the resin to about 50–300 cps (Brookfield viscosity No. 2 spindle at 60 RPM). Suitable solvents include alcohols, e.g, methanol, ethanol, and isopropyl alcohol, and ketones, e.g., acetone and methyl ethyl ketone. Methanol is the preferred solvent. The organic solvent can be added to the resin at any time prior to the step of saturating the fibrous substrate sheets with the laminating composition. The solvent is preferably added at the end of the resin manufacturing process, i.e., as the resin is being cooled.

While the melamine-modified phenolic resin is being cooled, or up to the time a fibrous substrate sheet is saturated, other laminating resin modifiers may optionally be added to the laminating resin composition for further enhancing specific properties of the laminating resin. For example, to enhance the penetration characteristics of the lamination resin a material selected from the group consisting of formamide, N-methyl formamide, N,N-dimethyl formamide, N-ethyl formamide, N,N-diethyl formamide, N,N-diphenyl formamide and N-methyl formanilide may be included in the ultimate composition. Formamide is preferred based on cost, commercial availability and known safety. About 2 to 15% by weight of the laminating resin composition, preferably about 5%, of the formamide or disclosed equivalent is added to the resin.

Adding a small amount of formamide or the disclosed formamide equivalent to the fast curing melamine-modified phenolic resin of this invention produces a laminating resin composition having a high penetration. Importantly, this enhanced penetration is achieved without having to increase the relative amount of water-soluble organic solvent in the laminating resin. The ability to achieve a balanced ratio of water to organic solvent is very important since a higher organic solvent content generally detrimentally lowers the flash point of the laminating resin composition while a higher water content (which raises the flash point) generally is detrimental to penetration speed. As a result of adding the formamide or disclosed formamide equivalent to the resin, a reduction in the amount of organic solvent relative to water is actually permitted while maintaining the laminating composition's penetration characteristics. Consequently, an enhanced penetration is provided without an undesirable lowering of the flash point of the laminating resin.

A small amount of an aldehyde scavenger also may be added to reduce the free aldehyde content of the resin to below about 2%. A small amount of a polyamide resin and/or a polyol, e.g., a polyglycol or a polyglycerine, may be added to further aid penetration and enhance resin flow at the low consolidation pressures typical of the continuous laminating process. A suitable lubricant also may be added to ease the release of the fully cured laminate from the pressure rolls. A wetting agent generally should not be included in the composition. Such wetting additives increase resin cost and also tend to increase the moisture sensitivity of the finished laminate, leading to blistering.

Since the addition of such modifiers may alter the pH of the ultimate composition, additional weak acid will be added, as required, to adjust the final pH of the composition to within the range of about 7.0 to about 9.0. At pH values outside of this range, the stability of the laminating resin composition is significantly impaired. Preferably, the pH of the laminating resin composition is adjusted to within the range of about 7.0 to about 8.0.

A particular advantage of the present invention is that it is not necessary to add an additional curing agent to the laminating resin composition just prior to use, as is generally required when using unmodified resole-type phenolic laminating resins of the prior art. In order to produce a laminating resin composition having penetration, and curing characteristics equivalent to the composition of the present invention when using prior art phenolic resole resins, a resin curing catalyst, such as a resorcinol-based resin, generally had to be added to the laminating composition. This additive tended to adversely affect the properties of the finished laminate.

The present invention also comprises a continuous, relatively low pressure laminating process for producing decorative laminates employing the fast-curing, melamine-modified, thermosetting phenolic laminating resin composition of this invention. In the first step, a plurality of continuous, fibrous substrate sheets are saturated with the fast-curing, melamine-modified phenolic laminating resin described above. The fibrous substrate sheet may be paper, e.g., heavy kraft paper, textiles, asbestos, glass fibers and the like. The substrate typically is saturated in as little as 10 seconds. The resin-saturated substrate then is dried to evaporate the solvent and partially advance the resin (B-stage). At temperatures between about 100° and 200° F. drying takes between about 15 and 30 seconds. Normally, the resin content of the resin-impregnated sheets will be on the order of 20% to 60% by weight. The so treated sheets are non-tacky and normally are wound on rolls and stored for later consolidation. The rolls must not be subjected to elevated temperatures during storage.

According to the remainder of the process, the plurality of continuous sheets then are consolidated, e.g., between the nips of opposing, serially positioned rollers, at a pressure of between about 140 to about 750 psi, e.g., 200 psi and for a time and at a temperature sufficient to cure the resin. Press temperatures are generally between about 350° to 450° F. At these conditions, the consolidated laminate is fully cured in about 10 to 30 seconds. The fully cured laminate may be cut to size immediately after curing or as-above may be stored in roll form for later use.

While this invention has been described primarily for use in preparing decorative laminates, the invention is broadly suited to the manufacture of other laminates which normally employ phenolic-type resins, e.g., laminates for electrical applications. Similarly, while the laminating resin of this invention is particularly suitable for use in connection with the continuous low pressure laminating process, it can also be used, if desired, to prepare high pressure laminates using a conventional or accelerated batch process. Finally, the laminating resin of this invention can be used to saturate a single continuous fibrous substrate sheet, followed by curing the saturated sheet to produce a single-ply resin-impregnated product.

The following examples are included for illustrative purposes only and are not intended to limit the scope of this invention.

EXAMPLE 1

A suitable thermosetting melamine-modified phenolic resin for preparing the laminating resin composition of the present invention was produced by blending 37.7 parts by weight of 50% aqueous formaldehyde solution with 23.6 parts standard phenol and 7.9 parts standard melamine and reacting the mixture under alkaline conditions. A small amount of triethanolamine was added to the mixture to neutralize formic acid present in the formaldehyde and/or formed during the condensation reaction. The addition of triethanolamine to the reaction mixture maximizes the effectiveness of the alkaline catalyst used.

The phenol-formaldehyde-melamine condensation reactions were initiated by adding a sufficient quantity of potassium carbonate to the reaction mixture as the alkaline catalyst material, to establish a pH of about 8.5 to 9.0 and then heating the mixture. The reaction mixture was heated to about 90°–100° C. (under conditions allowing for atmospheric reflux) to controllably advance the reactions. The mixture was reacted for about 20–30 minutes, and was thereafter cooled. Lactic acid was added to neutralize the reaction mixture to a pH within the range of about 7.0–7.5 and the resin was vacuum dehydrated with heating. After the water content of the resin had been reduced to the desired extent, the resin was cooled to ambient conditions.

While the above-described resin was undergoing final cooling, the following modifiers were added: a polyamide resin; a formaldehyde scavenger; a polyglycerine; methanol; formamide and a lubricant. Additional lactic acid, also was added to adjust the pH to within the range of 7.0 to 7.5. The foregoing resin performed satisfactorily in the above-described high speed, low pressure continuous laminating process. This laminating resin composition exhibited a 150° C. Stroke cure of about 55 sec. to 60 sec.; a minimum open cup flash point of 150° F., and a viscosity of 80–120 cps and the resin composition was stable (i.e., maintained its necessary properties for use as a laminating resin for the continuous process) for three weeks at or below room temperature.

EXAMPLE 2

The Example 1 process for preparing a melamine-modified phenolic resin was substantially repeated at other phenol to melamine ratios. The degree of resin advancement (as reflected by the Gardner-Holt viscosity) of the resin also was varied. The Stroke cure of the so-prepared resins were measured. The results are illustrated in Table 1.

TABLE 1

| Phenol-Melamine mole ratio | Resin Viscosity | Stroke Cure (sec.) at pH of 7.0 |
| --- | --- | --- |
| 9 | G–H | 77 |
| 9 | R–S | 69 |
| 5.7 | G–H | 67 |
| 5.7 | R–S | 59 |
| 4.0 | G–H | 55 |
| 4.0 | J–K | 53 |
| 4.0 | R–S | 49 |
| 3.0 | G–H | 50 |
| 3.0 | R–S | 35 |

As illustrated, as the amount of melamine and/or the degree of resin advancement is increased the cure rate of the resin is enhanced. However, resins having high melamine contents generally were less stable and exhibited poorer penetration characteristics than the Example 1 laminating resin composition.

While preferred embodiments of this invention have been discussed herein, those skilled in the art will appreciate that changes and modifications may be made without departing from the spirit and scope of this invention, as defined in and limited only by the scope of the appended claims.

We claim:

1. A process for producing a laminate comprising the steps of:
   (a) saturating a plurality of continuous fibrous substrate sheets with a fast-curing melamine-modified phenolic laminating resin having a pH in the range of about 7.0 to about 9.0 comprising
      (i) a melamine-modified phenolic resin, and
      (ii) a water-soluble, organic solvent for said melamine-modified phenolic resin; said melamine-modified phenolic resin prepared by
         (1) forming a reaction mixture containing phenol, aldehyde and melamine, the mole ratio of aldehyde to phenol in said reaction mixture being maintained in the range of about 1.5 to about 3.0 and the mol ratio of phenol to melamine in said reaction mixture being maintained in the range of about 2.0 to about 10.0;
         (2) adjusting the pH of the reaction mixture to within the range of about 7.5 to about 9.5 by adding an inorganic alkaline catalyst;
         (3) co-reacting said reaction mixture of phenol, aldehyde and melamine in the presence of said inorganic alkaline catalyst and at said pH range until said reaction mixture exhibits a Gardner-Holt viscosity within the range of about B to S;
         (4) neutralizing said reaction mixture of step (3), and
         (5) dehydrating said neutralized reaction mixture to a maximum moisture content of about 15% by weight;
   (b) continuously drying and partially curing the resin saturated continuous sheets to produce resin-impregnated continuous sheets; and
   (c) continuously consolidating the resin-impregnated continuous sheets at a pressure between about 140 to 750 psi and for a time and at a temperature sufficient to fully cure the resin.

2. The process of claim 1 wherein said inorganic alkaline catalyst is potassium carbonate.

3. The process of claim 1 wherein the water-soluble organic solvent is methanol.

4. A process for producing a laminate comprising the steps of:
   (a) saturating a plurality of continuous fibrous substrate sheets with a fast-curing melamine-modified phenolic laminating resin having a pH in the range of about 7.0 to about 8.0 consisting essentially of
      (i) a melamine-modified phenolic resin, and
      (ii) a water-soluble, organic solvent for said melamine modified phenolic resin; said melamine-modified phenolic resin prepared by
         (1) forming a reaction mixture containing standard phenol, formaldehyde and standard melamine, the mol ratio of formaldehyde to phenol in said reaction mixture being maintained in the range of about 1.5 to about 3.0 and the mol ratio of phenol to melamine in said reaction being maintained in the range of about 3.0 to about 6.0;
         (2) adjusting the pH of the reaction mixture to within the range of about 8.0 to about 9.0 by adding an alkali metal carbonate catalyst;
         (3) co-reacting said reaction mixture of standard phenol, formaldehyde and standard melamine in the presence of said alkali metal carbonate catalyst at said pH range until said reaction mixture exhibits a Gardner-Holt viscosity within the range of about F to I;
         (4) neutralizing said reaction mixture to a pH of about 7.0 to about 8.0, and
         (5) dehydrating said neutralized reaction mixture to a maximum moisture content of about 15% by weight;
   (b) continuously drying and partially curing the resin saturated continuous sheets to produce resin-impregnated continuous sheets; and
   (c) continuously consolidating the resin-impregnated continuous sheets at a pressure between about 140 to 750 psi and for a time and at a temperature sufficient to fully cure the resin.

5. The process of claim 4 wherein said alkali metal carbonate catalyst is potassium carbonate.

6. The process of claim 4 wherein the water-soluble organic solvent is methanol.

7. The product produced by the process of claim 1.

8. The product produced by the process of claim 2.

9. The product produced by the process of claim 4.

10. The product produced by the process of claim 5.

11. A resin-impregnated fibrous sheet prepared by
    (a) saturating a continuous fibrous substrate sheet with a fast-curing melamine-modified laminating resin, having a pH in the range of about 7.0 to about 9.0 comprising
        (i) a melamine-modified phenolic resin, and
        (ii) a water-soluble, organic solvent for said melamine-modified phenolic resin; said melamine-modified phenolic resin prepared by
            (1) forming a reaction mixture containing phenol, aldehyde and melamine, the mol ratio of aldehyde to phenol in said reaction mixture being maintained in the range of about 1.5 to about 3.0 and the mol ratio of phenol to melamine in said reaction mixture being maintained in the range of about 2.0 to about 10.0;
            (2) adjusting the pH of the reaction mixture to within the range of about 7.5 to about 9.5 by adding an inorganic alkaline catalyst;
            (3) co-reacting said reaction mixture of phenol, aldehyde and melamine in the presence of said inorganic alkaline catalyst and at said pH range until said reaction mixture exhibits a Gardner-Holt viscosity within the range of about B to S;
            (4) neutralizing said reaction mixture of step (3), and
            (5) dehydrating said neutralized reaction mixture to a maximum moisture content of about 15% by weight, and
    (b) curing the resin-saturated continuous sheet.

12. The resin-impregnated fibrous sheet of claim 11 in roll form.

13. A resin-impregnated fibrous sheet prepared by
    (a) saturating a continuous fibrous substrate sheet with a fast-curing melamine-modified laminating resin having a pH in the range of about 7.0 to about 8.0 consisting essentially of
        (i) a melamine-modified phenolic resin, and
        (ii) a water-soluble, organic solvent for said melamine-modified phenolic resin; said melamine-modified phenolic resin prepared by
            (1) forming a reaction mixture containing standard phenol, formaldehyde and standard melamine, the mol ratio of formaldehyde to phenol in said reaction mixture being maintained in the range of about 1.5 to about 3.0 and the mol ratio of phenol to melamine in said reaction being maintained in the range of about 3.0 to about 6.0;
            (2) adjusting the pH of the reaction mixture to within the range of about 8.0 to about 9.0 by adding an alkali metal carbonate catalyst;
            (3) co-reacting said reaction mixture of standard phenol, formaldehyde and standard melamine in the presence of said alkali metal carbonate catalyst at said pH range until said reaction mixture exhibits a Gardner-Holt viscosity within the range of about F to I;
            (4) neutralizing said reaction mixture to a pH of about 7.0 to about 8.0, and
            (5) dehydrating said neutralized reaction mixture to a maximum moisture content of about 15% by weight, and
    (b) curing the resin-saturated continuous sheet.

14. The resin-impregnated fibrous sheet of claim 13 in roll form.

* * * * *